United States Patent [19]

Negoro et al.

[11] Patent Number: 5,444,514
[45] Date of Patent: Aug. 22, 1995

[54] PHOTOGRAPHIC PROCESSING APPARATUS

[75] Inventors: Hisashi Negoro; Tsukasa Nakano; Yoshiyuki Minakata, all of Wakayama, Japan

[73] Assignee: Noritsu Koki Co., Ltd., Wakayama, Japan

[21] Appl. No.: 301,010

[22] Filed: Sep. 6, 1994

[30] Foreign Application Priority Data

Sep. 8, 1993 [JP] Japan .................. 5-223483

[51] Int. Cl.$^6$ .............................................. G03B 27/58
[52] U.S. Cl. .................................................... 355/74
[58] Field of Search ............... 355/40, 41, 54, 74, 355/75, 77; 354/308, 319-323, 339

[56] References Cited

U.S. PATENT DOCUMENTS

| | | | |
|---|---|---|---|
| 4,185,912 | 1/1980 | Schwartz | 354/308 |
| 4,783,686 | 11/1988 | Isii et al. | 355/74 X |
| 4,864,354 | 9/1989 | Crasnianski | 356/322 X |
| 4,996,555 | 2/1991 | Takemoto et al. | 355/44 |
| 5,008,701 | 4/1991 | Tokuda | 355/71 X |
| 5,162,842 | 11/1992 | Shiota | 355/40 |
| 5,307,114 | 4/1994 | Nitsch et al. | 355/29 |

Primary Examiner—D. Rutledge
Attorney, Agent, or Firm—Wenderoth, Lind & Ponack

[57] ABSTRACT

A photographic processing apparatus capable of printing films having different widths. An exposure unit for printing film images on photographic paper has a negative mask to guide the movement of the films. The negative mask is provided with a plurality of film guide paths which correspond to widths of the films. A transfer unit is provided to move the negative mask in a direction perpendicular to the feed direction of the film. Along the film feed path toward the negative mask are provided sensors to detect the film size. Printing is carried out in such a manner that after the film size has been detected by the sensors, the transfer unit is controlled by the signal from the sensors to bring one of the film guide paths which corresponds to the film size into alignment with the exposure axis.

1 Claim, 6 Drawing Sheets

PHOTOGRAPHIC PROCESSING APPARATUS

BACKGROUND OF THE INVENTION

This invention relates to a photographic processing apparatus in which a film is developed and dried, images on the film are printed on photographic paper, and the photographic paper is developed.

A photographic processing apparatus is known in which a series of operations including the development and drying of film, printing on photographic paper and development thereof are automatically carried out.

In such a photographic processing apparatus as mentioned above, a negative mask having a film guide path is provided in the exposure unit. The images are printed on the photographic paper by emitting the light to a film supported by the negative mask.

In such a conventional photographic processing apparatus, the film guide path has one common size and the negative mask is fixedly supported in the exposure unit. Thus, it was possible to process the film of only one size.

It is an object of the present invention to provide a photographic processing apparatus which can process films of different widths.

SUMMARY OF THE INVENTION

In order to solve the abovesaid problems, in the present invention, there is provided a photographic processing apparatus having a film developing unit, a drying unit, an exposure unit to which a film developed and dried is fed, and a photographic paper developing unit, the exposure unit having a negative mask having a film guide path, the film being fed along the film guide path and illuminated by the light to print film images on the film to photographic paper, which is fed to the photographic paper developing unit for development, characterized in that the plurality of film guide paths are provided in parallel to one another in the negative mask for different widths of films, that a transfer means for transferring the negative mask is provided to bring one of the film guide paths into alignment with an exposure axis, that a plurality of sensors are provided along a film feed path toward the negative mask to detect the width of the film, so that the film guide path selected based on the signal from the sensors for the film having a detected width will be aligned with the exposure axis.

With this photographic processing apparatus, the width of the film is detected by the sensors. A film guide path is selected to the detected film size. The position of the negative mask is adjusted so that the selected film guide path will be aligned with the exposure axis. The printing is carried out by feeding the film thereto.

As described above, with this photographic processing apparatus according to the present invention, a plurality of film guide paths each corresponding to the film size are provided in the negative mask in the exposure unit. The negative mask is moved according to the width of the film fed therein until the film guide path corresponding to the film size is aligned with the exposure axis. Thus, the films of different sizes can be printed in one photographic processing apparatus.

Other features and objects of the present invention will become apparent from the following description made with reference to the accompanying drawings, in which:

DETAILED DESCRIPTION OF THE PREFERRED EMBODIMENT

Now we shall explain the embodiment in this invention with reference to the accompanying drawings.

Figure 1:
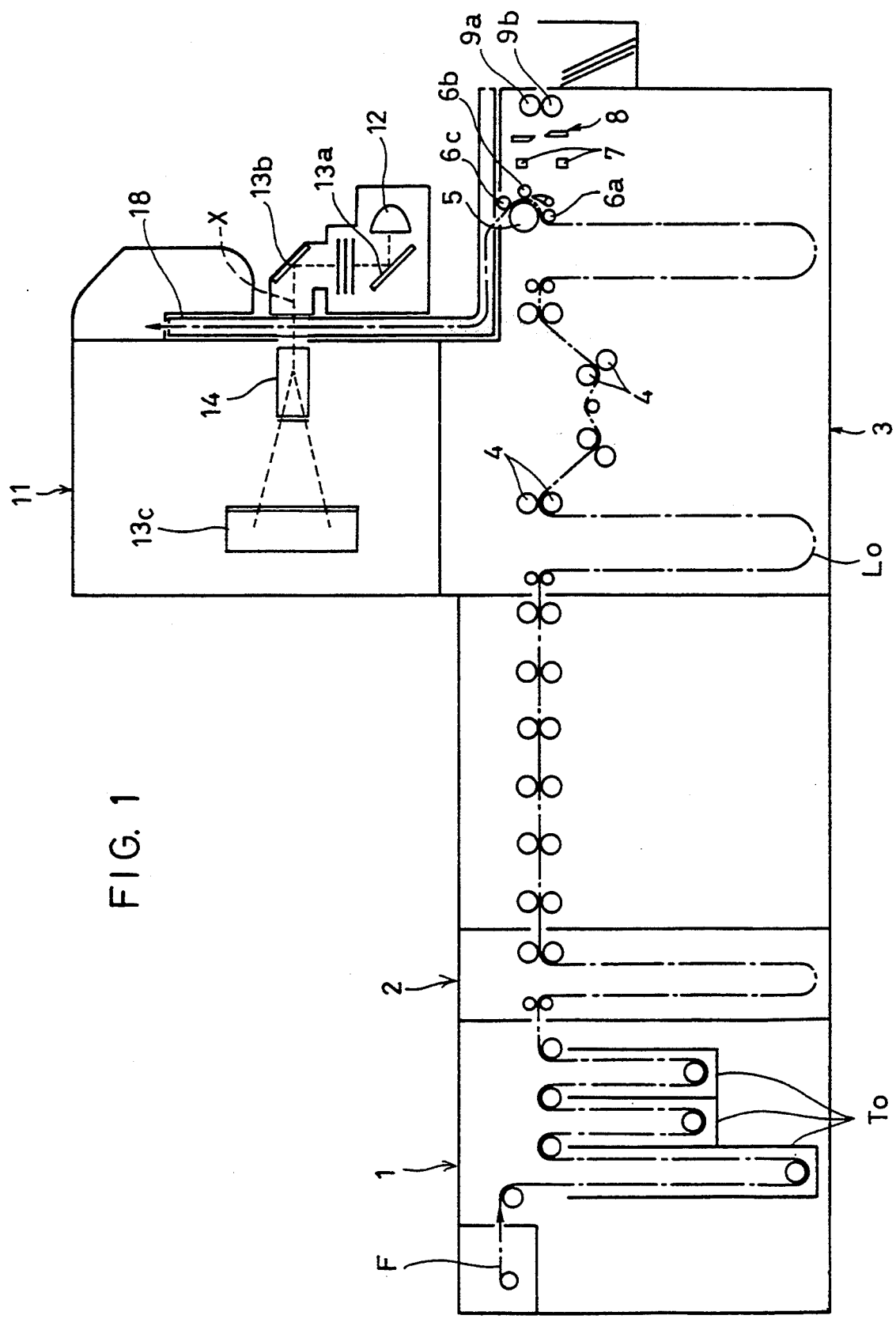
FIG. 1 is a schematic view showing a portion of the photographic processing apparatus according to this invention from the film developing unit to the exposure unit.
Figure 6:
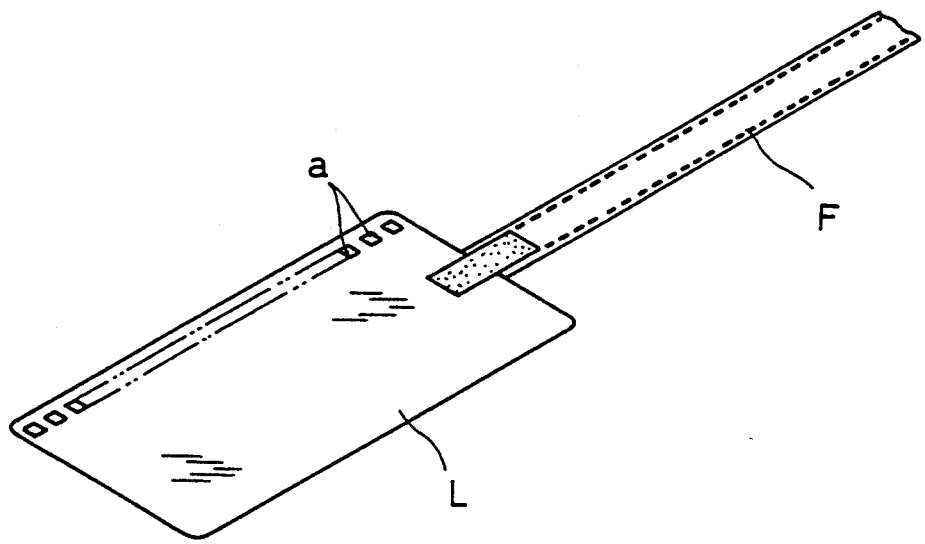
FIG. 6 is a perspective view showing the leader and the film.

FIG. 1 is a schematic view of a photographic processing apparatus according to the present invention. FIG. 6 shows a film F processed by this photographic processing apparatus. The film F is connected to a flexible leader L which is formed with a plurality of perforations a at regular intervals.

As shown in FIG. 1, the film F, led by the leader L, is fed to a plurality of treating tanks $T_0$ containing different treating solutions in a developing unit 1. After developed, the film F is dried in a drying unit 2 next to the developing unit 1. Thereafter, the film F is fed into a film stocking unit 3.

The film stocking unit 3 has a plurality of pairs of feed rollers 4 arranged in line. The leader L and the film F are carried in one direction by the rotation of the feed rollers 4. If the preceding portion of the film F stagnates in the film stocking unit 3, a loop $L_0$ is created between the feed rollers 4 so as to stop the feed of the film F until the preceding portion of the film F is fed out.

Along a film path in the film stocking unit 3 are provided a turn roller 5 and first to third press rollers 6a to 6c mounted around the turn roller 5.

Figure 3:
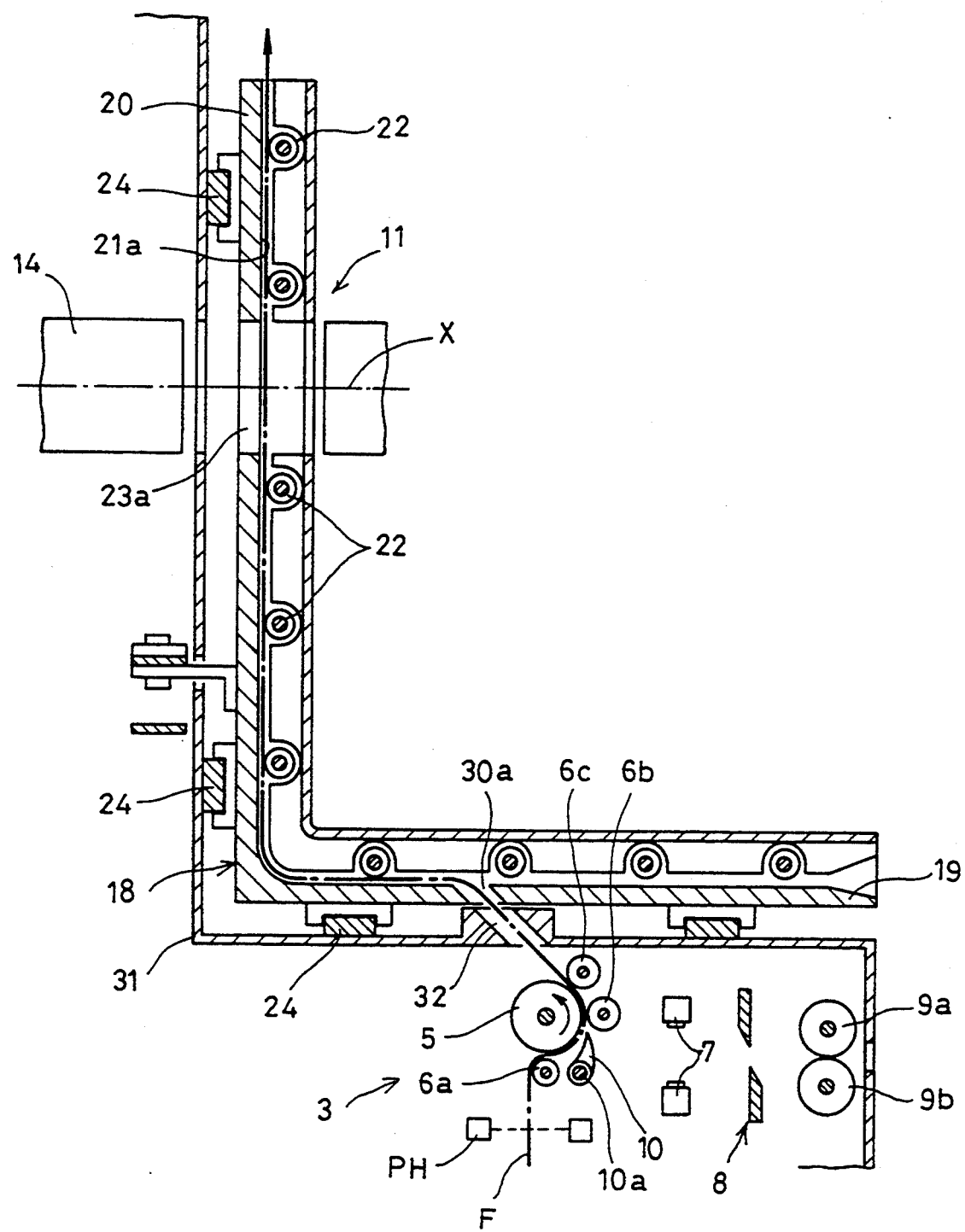
FIG. 3 is a vertical sectional front view of the negative mask of the same.

As shown in FIG. 3, in front of the turn roller 5 are mounted film sensors 7 to detect perforations of the film F. A cutter 8 and a pair of feed rollers 9a and 9b are provided ahead of the film sensors 7. When the film sensors 7 detect the perforations of the film F, the cutter 8 is actuated to cut the film F apart from the leader L. The leader L, now cut off from the film F, is removed from the film path by the feed rollers 9a and 9b.

While the film F is being cut from the leader, the turn roller 5 is stopped. After the film F has been cut off, it will be rotated in a reverse direction to feed the film F in an opposite direction for a predetermined length.

A film guide 10 is provided under the turn roller 5. After the film F has been fed in an opposite direction, the film guide 10 will be pivoted around an axis 10a toward the turn roller 5 actuated by a pivot mechanism (not shown) so as to press the leading end of the film F against the circumference of the turn roller 5.

With the film F pressed against the turn roller 5, the turn roller 5 will rotate in the original direction (shown by arrow in FIG. 3) to feed the film F to an exposure unit 11 next to the film stocking unit 3.

Figure 2:
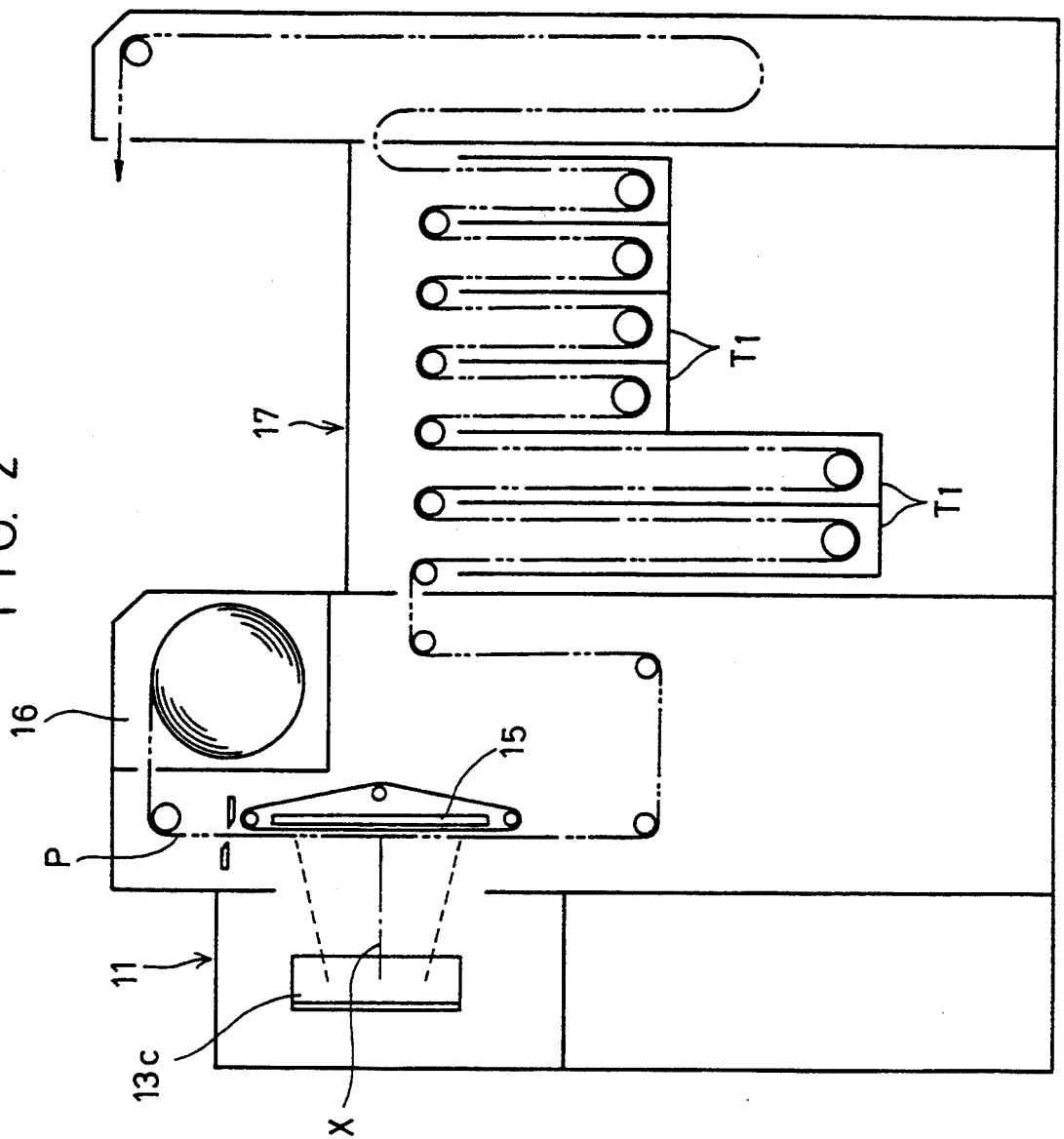
FIG. 2 is a schematic view showing the film developing unit and the exposure unit of the same.

As shown in FIG. 1, in the exposure unit 11, the light from a light source 12 is thrown to the film F reflected by mirrors 13a and 13b. The images on the film F are enlarged by a printing lens 14 to print them on photographic paper P drawn onto an exposure table 15 (FIG. 2). In the figure, X designates an exposure axis.

The photographic paper P in the form of a roll is accommodated in a magazine 16 and drawn onto the exposure table 15. The printed photographic paper P is further fed through a plurality of treating tanks $T_1$ containing different treating solutions. In this manner, the photographic paper P is developed.

As shown in FIG. 1, a negative mask 18 is provided in the exposure unit 11 to guide the film F fed from the turn roller 5 onto the exposure axis X.

Figure 4:
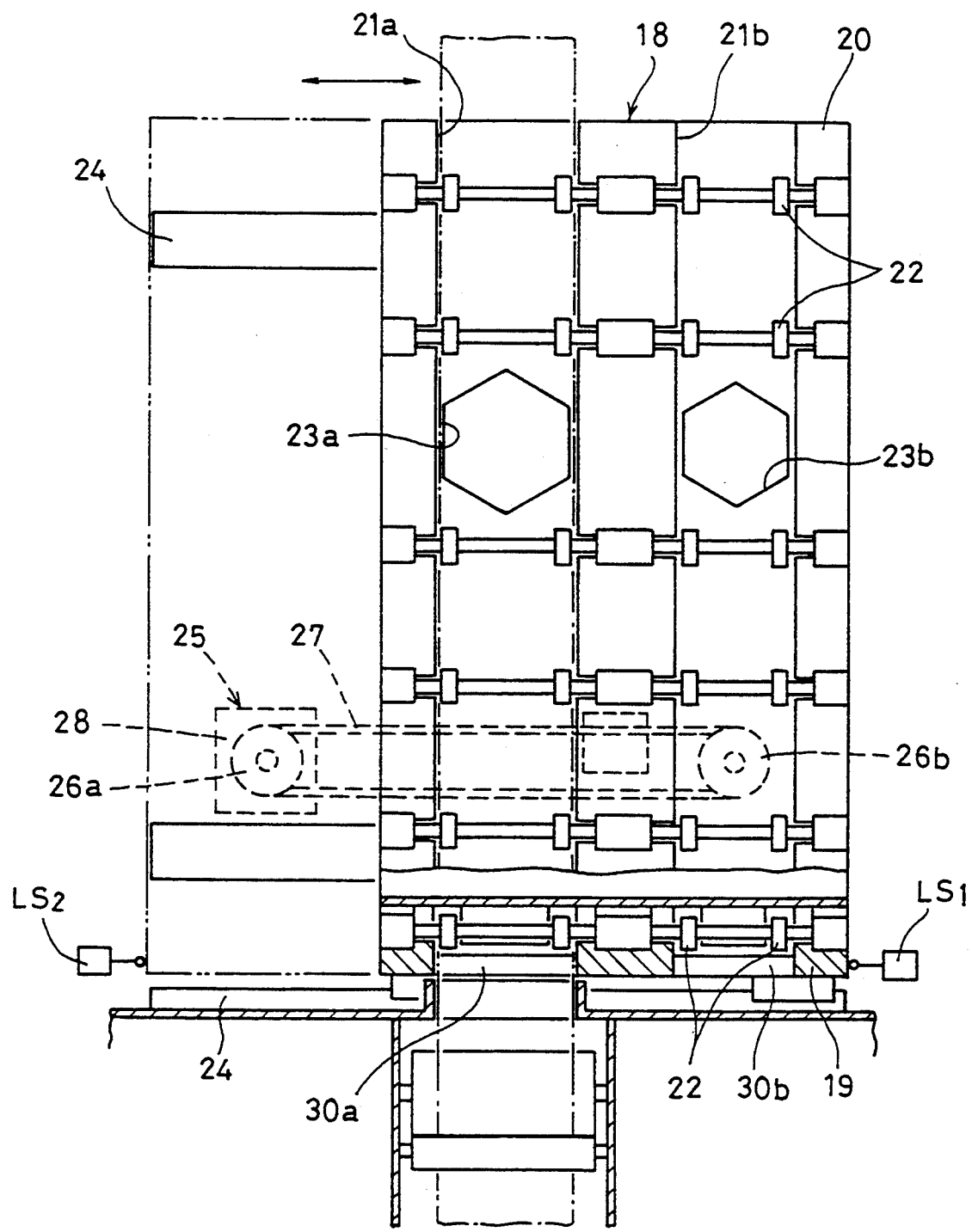
FIG. 4 is a partially cutaway sectional side view of FIG. 3.
Figure 5:
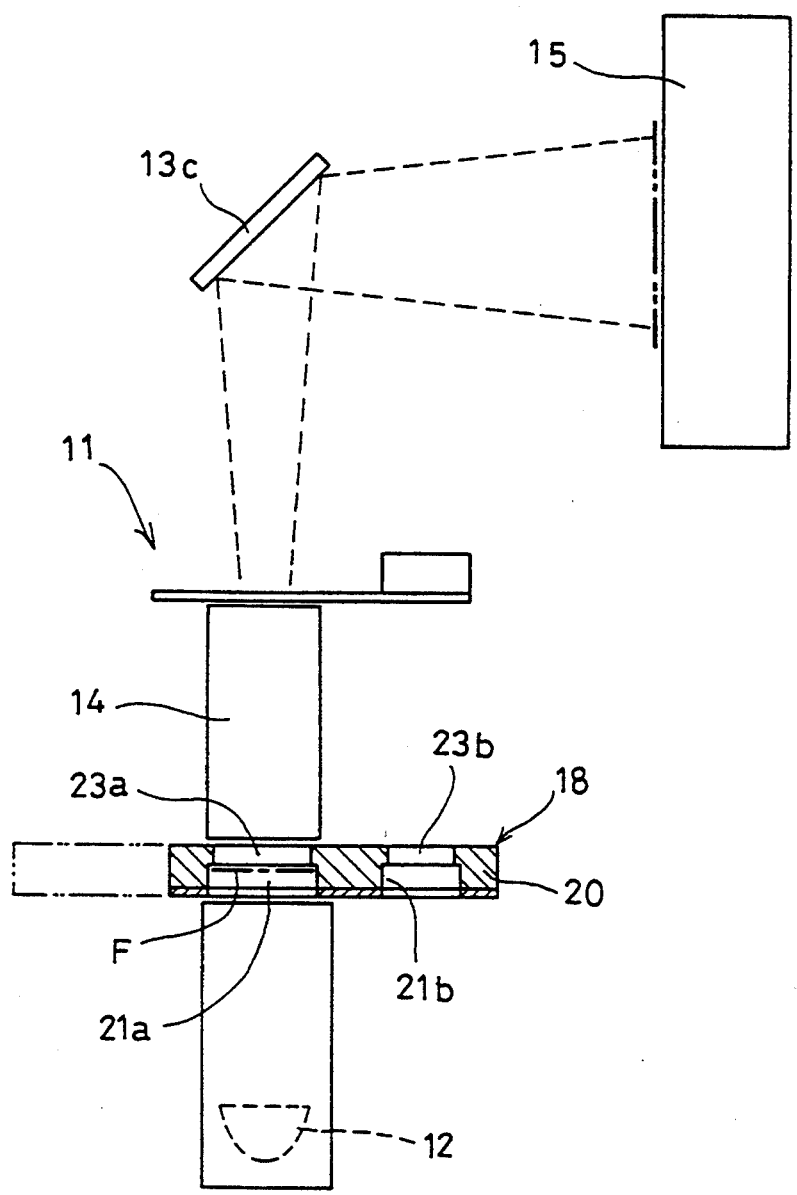
FIG. 5 is a schematic plan view of the exposure unit of the same.

FIGS. 3 and 4 show in detail the negative mask 18 which is L-shaped and comprises a horizontal portion 19 and a vertical portion 20 joined together. Inside the negative mask 18 are parallely arranged a first film guide path 21a and a second film guide path 21b having different widths from each other. A plurality of pairs of rollers 22 are provided for both of the film guide paths 21a and 21b.

The horizontal portion 19 of the negative mask 18 is formed at its bottom with film holes 30a and 30b along the film guide paths 21a and 21b, respectively.

Also, the vertical portion 20 of the negative mask 18 is formed with exposure windows 23a and 23b along the film guide paths 21a and 21b, respectively.

The negative mask 18 is supported so as to be movable in a direction perpendicular to the feed direction of the film F along a plurality of rails 24 mounted in parallel to one another. The negative mask 18 is moved by a transfer unit 25 (FIG. 4) until one of the film holes 30a and 30b is in alignment with a film outlet 32 formed in a case 31 and until one of the exposure windows 23a and 23b is aligned with the exposure axis X.

The transfer unit 25 may be of any arrangement. In this embodiment, it comprises a pair of geared pulleys 26a and 26b and a timing belt 27 provided therearound. As shown in FIG. 4, part of the timing belt 27 is coupled to the negative mask 18 so that one of the geared pulleys 26a and 26b is driven by a motor 28 to move the negative mask 18.

Switches LS1 and LS2 are provided at both ends of the path of the negative mask 18 in order to stop one of the first and second film guide paths 21a and 21b on the exposure axis X. When the switch LS1 or LS2 is turned on, the motor 28 will stop. Alternatively, a photo-sensor may be provided in place of these switches to control the stop position of the negative mask 18.

The motor 28 is activated in response to the detecting signals supplied from film-size detecting sensors PH provided along the film feed path in the film stocking unit 3.

Figure 7A:
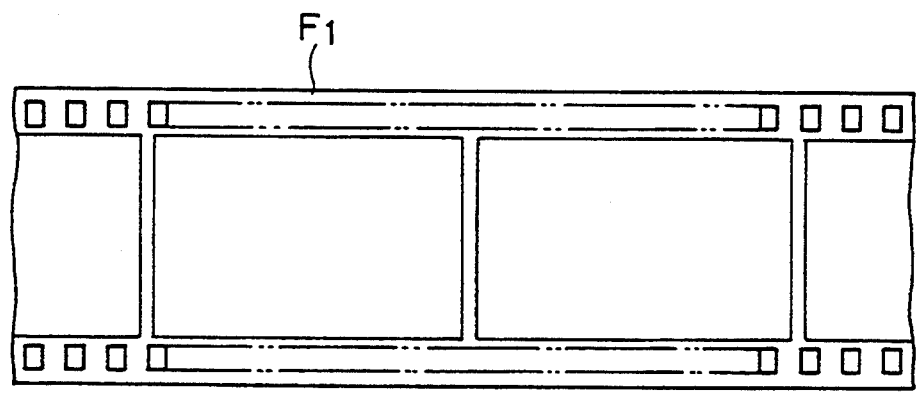
FIGS. 7A and 7B are front views each showing one portion of the film having a different width from another
Figure 7B:
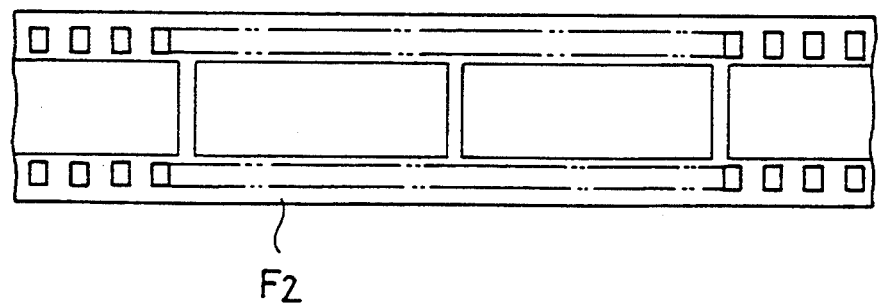

Let us assume that, of the films shown in FIGS. 7A and 7B, the one having a larger width is A-film F1 and the other one is B-film F2. Accordingly, the width of the first film guide path 21a corresponds to A-film F1 whereas the width of the second film guide path 21b to B-film F2.

In this state, supposing that the leader L connected to A-film F1 is fed to the film stocking unit 3 whereas A-film F1 is cut off from the leader L by the cutter 8; when the film-size detecting sensors PH detect that the film is A-film F1, the motor 28 shown in FIG. 4 is activated to move the negative mask 18 along the rails 24. When the exposure window 23a formed in the first film guide path 21a is aligned with the exposure axis X, the motor 28 will stop, and the negative mask 18 keep its position with the exposure window 23a aligned with the exposure axis X.

After the position of the negative mask 18 has been adjusted, A-film F1 is supplied to the first film guide path 21a from the film outlet 32 through the film hole 30a. When the first image frame exactly matches the exposure window 23a, A-film F1 is stopped to print it on the photographic paper P which has been drawn on the exposure table 15. Thereafter, A-film F1 is intermittently fed with its pitch defined by one frame. Every time A-film F1 stops, the film image thereof is printed on the photographic paper P intermittently moved for a predetermined stroke in one direction.

When A-film F1 is entirely fed to the first film guide path 21a, the next film is fed to the feed rollers 9a and 9b from between the turn roller 5 and the first press roller 6a. In this state, the film guide 10 is away from the turn roller 5. The next film F, i.e. B-film F2, is then cut off from the leader L by the cutter 8 and detected by the film-size detecting sensors PH. After A-film F1 has been discharged from the first film guide path 21a, the motor 28 will be activated to move the negative mask 18 along the rails 24 to align the exposure window 23b formed in the second film guide path 21b with the exposure axis X.

After the position of the negative mask 18 has been adjusted, B-film F2 is fed to the second film guide path 21b and printing is carried out.

In the embodiment, two film guide paths, i.e. the first and second film guide paths 21a and 21b are provided in the negative mask 18, but their number is not limited thereto.

What is claimed is:

1. A photographic processing apparatus having a film developing unit, a drying unit, an exposure unit to which a film developed and dried is fed, and a photographic paper developing unit, said exposure unit having a negative mask having a film guide path, said film being fed along said film guide path and illuminated by the light to print images on said film to photographic paper, which is fed to said photographic paper developing unit for development, characterized in that a plurality of said film guide paths are provided in parallel to one another in said negative mask for different widths of films, that a transfer means for transferring said negative mask is provided to bring one of said film guide paths into alignment with an exposure axis, that a plurality of sensors are provided along a film feed path toward said negative mask to detect the width of the film, so that said film guide path selected based on the signal from said sensors for the film having a detected width will be aligned with said exposure axis.

* * * * *